United States Patent
de Halleux et al.

(10) Patent No.: US 7,681,180 B2
(45) Date of Patent: Mar. 16, 2010

(54) PARAMETERIZED TEST DRIVEN DEVELOPMENT

(75) Inventors: Jonathan Paul de Halleux, Seattle, WA (US); Nikolai Tillmann, Redmond, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 11/759,144

(22) Filed: Jun. 6, 2007

(65) Prior Publication Data

US 2008/0307264 A1    Dec. 11, 2008

(51) Int. Cl.
G06F 9/44    (2006.01)
G06F 11/00   (2006.01)

(52) U.S. Cl. .................. 717/124; 717/106; 714/32; 714/38

(58) Field of Classification Search .............. None
See application file for complete search history.

(56) References Cited

U.S. PATENT DOCUMENTS

| | | | |
|---|---|---|---|
| 5,651,111 A | 7/1997 | McKeeman et al. | |
| 5,761,408 A * | 6/1998 | Kolawa et al. | 714/38 |
| 6,182,258 B1 | 1/2001 | Hollander | |
| 6,725,399 B1 | 4/2004 | Bowman | |
| 6,804,796 B2 * | 10/2004 | Gustavsson et al. | 714/38 |
| 7,047,518 B2 | 5/2006 | Little et al. | |
| 2005/0204201 A1 | 9/2005 | Meenakshisundaram et al. | |
| 2006/0005169 A1 * | 1/2006 | Berstis et al. | 717/125 |
| 2006/0010426 A1 * | 1/2006 | Lewis et al. | 717/124 |
| 2006/0010429 A1 | 1/2006 | Ihara | |
| 2006/0230320 A1 * | 10/2006 | Salvador et al. | 714/38 |
| 2007/0033440 A1 * | 2/2007 | Tillmann et al. | 714/38 |
| 2007/0033442 A1 * | 2/2007 | Tillmann et al. | 714/45 |
| 2007/0033443 A1 * | 2/2007 | Tillmann et al. | 714/45 |
| 2007/0044078 A1 | 2/2007 | Cifra | |
| 2008/0115114 A1 * | 5/2008 | Palaparthi et al. | 717/128 |

OTHER PUBLICATIONS

Tillmann, N. and W. Schulte, "Parameterized Unit Tests," Proceedings of ESEC-FSE '05, pp. 253-262, Sep. 9, 2005.*
IDE Support for Test-Driven Development and Automated Grading in Both Java and C++, Anthony Allowatt and Stephen Edwards, Oct. 16-20, 2005, Sandiego, CA (attached as Article 1).
Research Proposal, "Generation of Comprehensive Test Cases for test-Driven Development to Aid the Learning Process", Boh Sui Jimm (attached as Article 2).
Agile Software Development, http://agilesoftwaredevelopment.com/, 5 pages (Attached as Article 3).
Jexercise—A Specification-Based and Test-Driven Exercise Support Plugin for Eclipse, Hallvard Traetteberg and Trond Aalberg (Attached as Article 4).

* cited by examiner

Primary Examiner—Michael J Yigdall
(74) Attorney, Agent, or Firm—Workman Nydegger (57) ABSTRACT

In one embodiment a computer system automatically generates unit tests. The computer system accesses a parameterized unit test that provides a base outline from which one or more unit tests are automatically generated, generates input parameter values for a unit of software code, automatically generates a unit test configured to assess the functionality of the unit of software code, and receives test results from a software testing program and provides feedback to a user. In other embodiments, a computer system automatically maintains a unit test database. The computer system receives a unit test at a unit test database, assigns a test identity to the received unit test, determines that the test identity assigned to the received unit test is unique when compared to other unit tests, determines that the received unit test has different functionality coverage characteristics, and adds the received unit test to the unit test database.

20 Claims, 5 Drawing Sheets

PARAMETERIZED TEST DRIVEN DEVELOPMENT

BACKGROUND

Computers are used all over the world to perform a wide variety of tasks. Computers perform these tasks by executing software code. Software code is typically written by one or more software developers using some type of integrated development environment (IDE). In many cases, developers are given a set of design instructions, and, using a programming language, draft software code that will implement the functions described in the design specifications. Depending on the nature and scope of the design specifications (or any subsequent modifications thereto), code for the software program can often become lengthy and complex. Complex code often leads to an increase in software bugs.

One method commonly used to decrease the likelihood of having bugs in the software code is known as test driven development (TDD). In TDD, a developer effectively breaks down a much larger program into smaller sections of functionality, often referred to as units. Each unit is testable by itself and typically only incorporates a single code function. For example, if a developer were writing a program designed to send email, the developer would break down the ultimate task—sending an email—into multiple subportions. These subportions would again be broken down until each unit involved only a single function. Once the function is identified, the developer typically writes software code specifically designed to test the unit with the identified function. Such code is usually called a "unit test."

The next step in TDD is to run the unit test and verify that the existing code for the tested unit (i.e. "unit code") fails the unit test. A failure is expected at this point in the TDD methodology by design to verify that the unit test actually verifies the functionality. Once the unit code fails the unit test, the developer knows the unit test is working properly and can begin revising the unit code so that it will eventually pass the unit test. Code revisions are typically minimal in nature with an overall goal of simplicity and efficiency. The resulting code tends to have fewer bugs. In the broad sense, if each unit works properly on its own, the chances are much better that when the units are combined, they will produce the desired functionality (e.g., sending an email). Once the developer has made enough revisions to the unit code so that it passes the unit test, the developer identifies the next unit of functionality and drafts a unit test to assess the functionality of that unit. This process repeats until all identified functions have passed the unit tests and may then be tested in combination to verify that the units work with each other.

However, this TDD approach, sometimes referred to as an element of "Extreme Programming," is not always the most efficient. Each unit to be tested must first be identified. This leaves open the possibility that the developer may overlook one or more important portions of functionality that should be incorporated into the program. Furthermore, unit tests are only designed to test a single code unit. Thus, developers using TDD are continually drafting new unit tests for each new piece of functionality. This process is often quite tedious and relies heavily on the developer's skill. If the unit test itself has been improperly coded or has simply been forgotten, the unit will not be properly tested. The unit may thus appear to pass, when in reality, it is working incorrectly. Thus, while aiding in reducing bugs, TDD relies heavily on the as developer to develop bug-free code.

BRIEF SUMMARY

Embodiments of the present invention are directed to automatically generating unit tests by instantiating generated input parameter values and to automatically maintaining a unit test database. In one embodiment of this invention, a computer system performs a method for automatically generating unit tests by instantiating one or more generated input parameter values. The computer system accesses a parameterized unit test configured to provide a base outline from which one or more unit tests are automatically generated. Next, the computer system generates input parameter values for a unit of software code that is to be tested. Next, the computer system automatically generates a unit test configured to assess the functionality of the unit of software code by instantiating one or more generated input parameter values. The generated input parameter values indicate parameters in which the unit of software code is to be tested. The generated input values correspond to the unit of software code. Next, the computer system receives test results from a software testing program including a test results status. Next, a computer system provides feedback to a user where the feedback indicates the test results status.

In other embodiments, a computer system performs a method for automatically maintaining a unit test database. The computer system receives a unit test at a unit test database. Next, the computer system assigns a test identity to the received unit test. The test identity is based the unit test software code, unit test covered functionality and/or the identity of the parameterized unit test from which the received unit test was derived. Next, the computer system determines that the test identity assigned to the received unit test is unique when compared to other unit tests in the unit test database. Next, the computer system, upon determining that the received unit test is unique in the unit test database, can either determine that the received unit test has different functionality coverage characteristics than other unit tests in the unit test database or that even though the test identity assigned to the received unit test is unique, the received unit test has fully overlapping functionality coverage characteristics when compared to other unit tests in the unit test database. Next, depending upon whether the received unit test has different or overlapping functionality coverage characteristics, the computer system adds or deletes the received unit test from the unit test database.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention are directed to automatically generating unit tests by instantiating generated input parameter values and to automatically maintaining a unit test database. In one embodiment of this invention, a computer system performs a method for automatically generating unit tests by instantiating one or more generated input parameter values. The computer system accesses a parameterized unit test configured to provide a base outline from which one or more unit tests are automatically generated. Next, the computer system generates input parameter values for a unit of software code that is to be tested.

Next, the computer system automatically generates a unit test configured to assess the functionality of the unit of software code by instantiating one or more generated input parameter values. The generated input parameter values indicate parameters in which the unit of software code is to be tested. The generated input values correspond to the unit of software code. Next, the computer system receives test results from a software testing program including a test results status. Next, a computer system provides feedback to a user where the feedback indicates the test results status.

In other embodiments, a computer system performs a method for automatically maintaining a unit test database. The computer system receives a unit test at a unit test database. Next, the computer system assigns a test identity to the as received unit test. The test identity is based the unit test software code, unit test covered functionality and/or the identity of the parameterized unit test from which the received unit test was derived. Next, the computer system determines that the test identity assigned to the received unit test is unique when compared to other unit tests in the unit test database.

Next, the computer system, upon determining that the received unit test is unique in the unit test database, can either determine that the received unit test has different functionality coverage characteristics than other unit tests in the unit test database or that even though the test identity assigned to the received unit test is unique, the received unit test has fully overlapping functionality coverage characteristics when compared to other unit tests in the unit test database. Next, depending upon whether the received unit test has different functionality coverage characteristics, the computer system adds or deletes the received unit test from the unit test database. The embodiments of the present invention may comprise a special purpose or general-purpose computer including various types of computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical (or recordable type) computer-readable media including RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable medium. Thus, any such connection is also properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1:
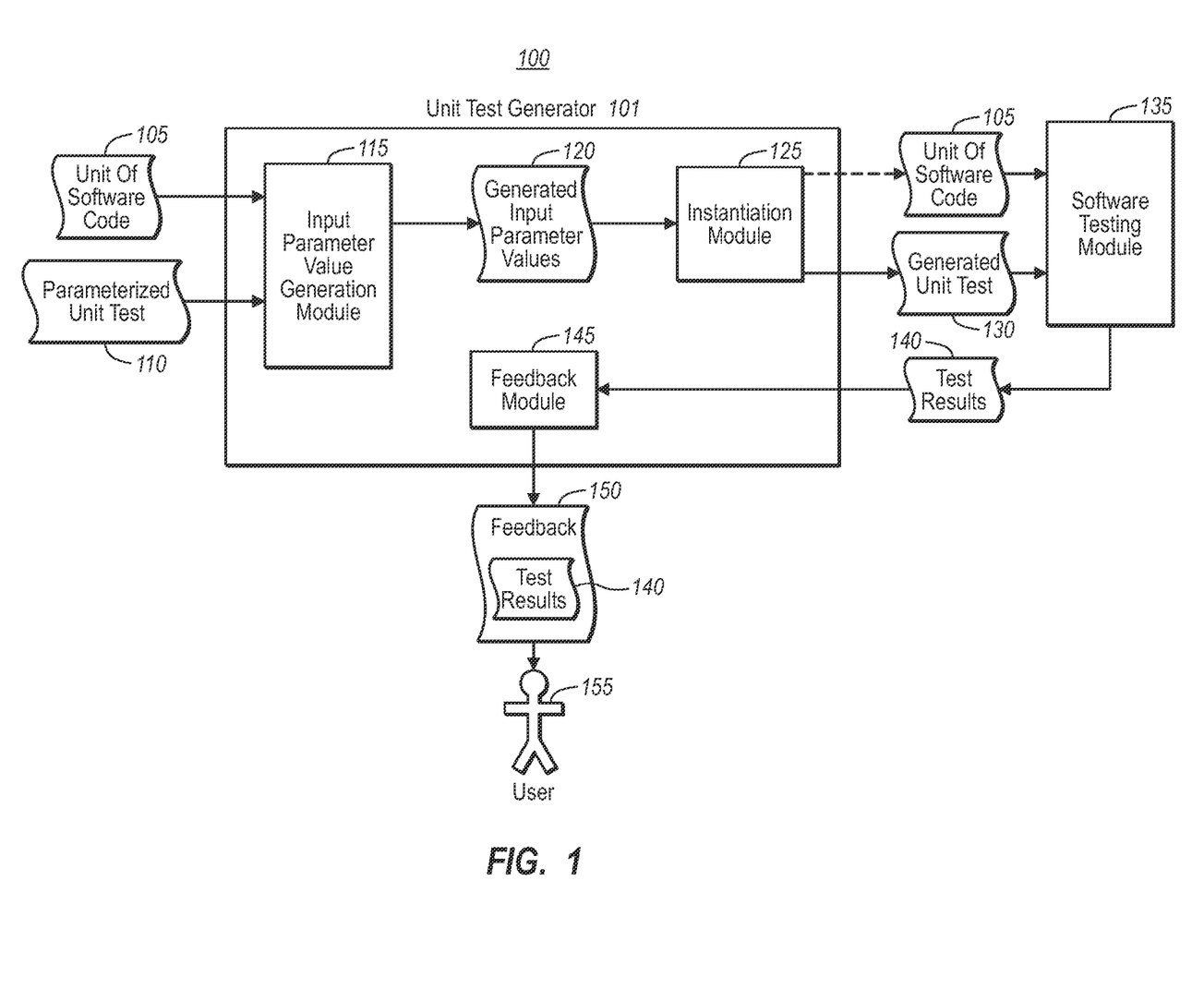
FIG. 1 illustrates an environment in which embodiments of the present invention may operate including automatically generating unit tests by instantiating one or more generated input parameter values.

FIG. 1 illustrates an environment 100 in which the principles of the present invention may be employed. Environment 100 includes unit test generator 101. In some embodiments, unit test generator 101 may be configured to receive a unit of software code 105 and a parameterized unit test 110. Software code unit 105 may be any portion of software source code, in any programming language. Software code unit 105 may be a script or portion thereof, a function, class or method, a single line of code or an entire software program. Parameterized unit test 110 may be configured and used in a variety of ways.

In some embodiments, PUT's are configured to test multiple behaviors and can be used as an outline from which other unit tests may be formed. PUT 110 may be used for testing software modules such as software code unit 105. PUT 110 may be configured to use generated values provided by input parameter value generation module 115 for such testing. As explained above with regard to test driven development, a developer typically first drafts a unit test to assess the functionality of a given method or software code unit. The developer then drafts software code that is intended to pass the unit test. Thus, after each test is eventually passed, the developer drafts a new unit test to assess another area of functionality. PUT 110 may be configured to generate unit tests automatically using generated input parameter values 120.

Instantiation module 120 may be configured to receive generated input parameter values which may be applied to PUT 110. Thus, parameter values may be generated for software code unit 105 such that new unit tests may be generated automatically, with little to no developer intervention. In some embodiments, unit tests are instantiated by instantiation module 125 using PUT 110 and generated input parameter values 120. This process will be explained in greater detail below.

Software code unit 105 may be passed to software testing module 135 along with generated unit test 130, where software code unit 105 is tested using generated unit test 130. In some cases, software code unit 105 may be sent to software testing module 135 from another module or, alternatively, from another computer system. In some embodiments, unit test generator 101 and the other components of FIG. 1 may be part of a single computer system, or alternatively, may be part of different computer systems configured to communicate with each other via some type of wired or wireless connection.

Software testing module 135 may be configured to output test results indicating the outcome of the testing of software code unit 105 using generated unit test 130. Test results 140 may include anything from a simple pass/fail designation to a full, line-by-line analysis of each input and output and any errors that may have occurred. Feedback module 145 may be configured to receive and process test results 140. Feedback 150 may include code fix suggestions indicating how the developer may be able to fix the code unit so that the code unit will pass the next unit test. Other types of feedback will be discussed in greater detail below. Feedback 150, along with test results 140 may be sent to computer user 155. Computer user 155 may be any type of computer user including a software developer or software tester.

Figure 2:
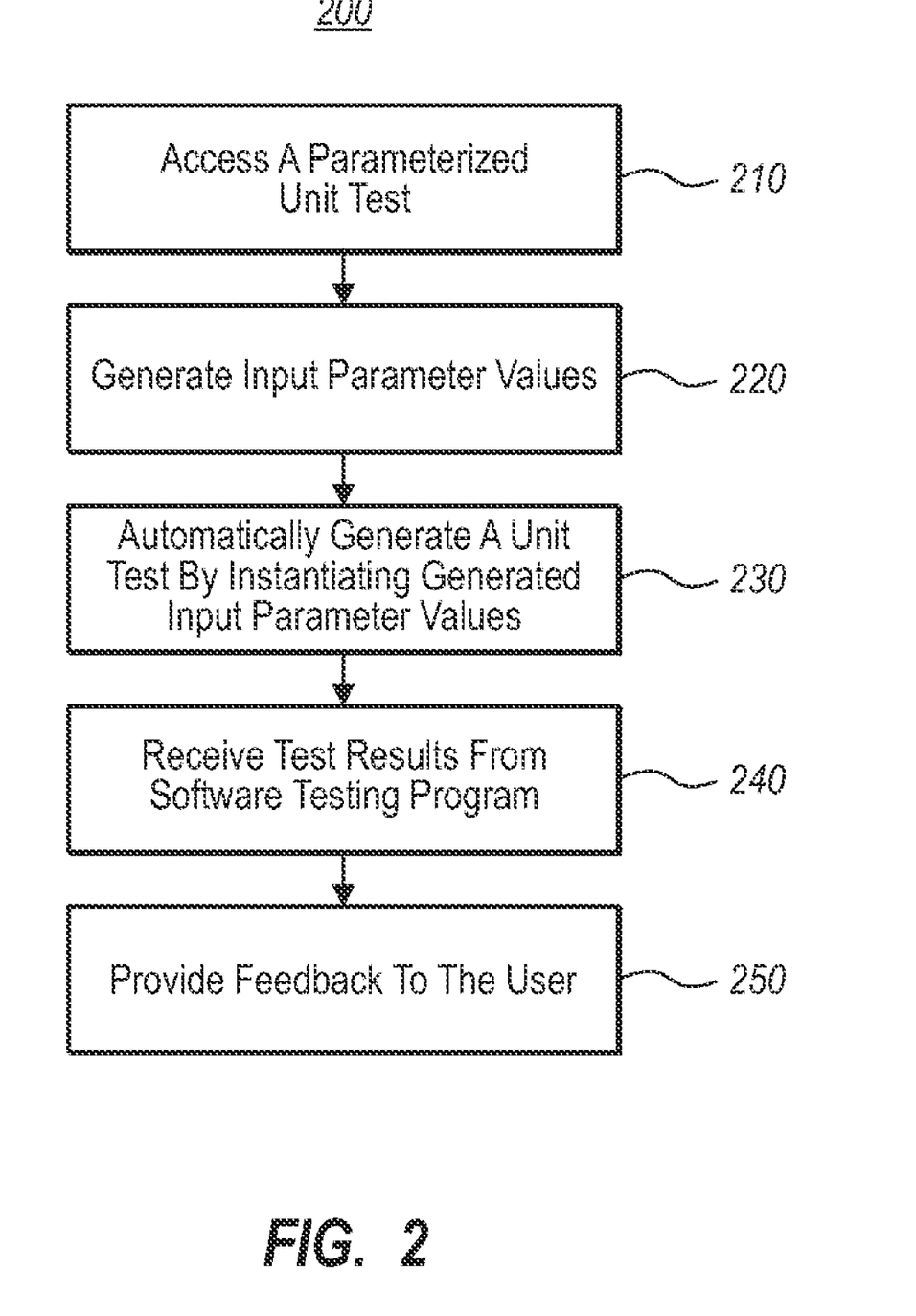
FIG. 2 illustrates a flowchart of an example method for automatically generating unit tests by instantiating one or more generated input parameter values.

FIG. 2 illustrates a flowchart of a method 200 for automatically generating unit tests by instantiating one or more generated input parameter values. The method 200 will now be described with frequent reference to the components and data of environment 100.

Method 200 includes an act of accessing a parameterized unit test configured to provide a base outline from which one or more unit tests are automatically generated (act 210). For example, input parameter value generation module 115 may access PUT 110 to provide a base outline from which unit test 130 may be automatically generated. Whereas unit tests are designed to test specific behavior in a single code unit, PUT's are configured to test multiple behaviors and can thus be used as an outline from which other unit tests may be formed. For example, a developer may write PUT 110 in such a way that many software code units may be tested against unit tests generated using a single PUT. In some cases, the base outline comprises one or more software functions that are to be tested. Using these software functions, input parameter values may be generated that correspond to the software functions.

Method 200 also includes an act of generating input parameter values for a unit of software code that is to be tested (act 220). For example, input parameter value generation module 115 may be configured to generate input parameter values 120 for software code unit 105 that is to be tested in software testing module 135. Input parameter value generation module 115 may generate input parameter values 120 for PUT 110 using symbolic execution, pairwise combinatorial techniques or any other techniques that may be used for generating input parameters for a PUT.

Symbolic execution typically assigns symbolic input variables to parameters of a parameterized unit test. Path constraints of a software code unit being tested (e.g. software code unit 105) are then identified during symbolic execution. Using a constraint solver, the path constraints can be solved to craft test inputs that satisfy one or more paths, each described by constraints characterized in the software code unit. Pairwise combinatorial techniques may similarly be used to generate input parameter values by providing various combinations or pairs of inputs, outputs, variables or other code elements.

Method 200 also includes an act of automatically generating a unit test configured to assess the functionality of the unit of software code by instantiating one or more generated input parameter values, the generated input parameter values indicating parameters in which the unit of software code is to be tested, the generated input values corresponding to the unit of software code (act 230). For example, instantiation module 125 may automatically generate a unit test 130 configured to assess the functionality of software code unit 105 by instantiating one or more of generated input parameter values 120. Generated input parameter values 120 may indicate parameters in which software code unit 105 may be tested and may correspond to software code unit 105.

As explained above, input parameter value generation module 115 may be configured to generate input parameter values using a variety of techniques such as symbolic execution and/or pairwise combination. In some cases, symbolic execution systematically finds relevant test inputs pertaining to a particular software code unit. Symbolic execution may, additionally or alternatively, input random values that, in effect, close an open-ended PUT by placing boundaries on possible input values. Similarly, with pairwise combinatorial parameter input generation, each parameter has a domain with one or more elements which are usually provided by the user. A pairwise permutation may be performed which analyzes a software code unit for all pair interactions. From this analysis, testable parameter input values may be determined that are usable in the PUT. Unit test 130 may then be generated by instantiating the input parameter values generated using symbolic execution, pairwise combinatorial analysis or other input parameter value generation technique.

Generated unit tests 130 may be substantially similar to unit tests written by a software developer (e.g., user 155). In some embodiments, generated unit tests 130 may be source code, compiled or uncompiled, and may be subdivided into smaller tests or combined to create larger tests. In some cases, software testing module may be running tests while input parameter value generation module 115 is searching for new input values for different tests. As explained above, instantiation module 125 may be configured to automatically generate unit tests using generated input parameter values 120 provided by input parameter value generation module 115.

Returning again to FIG. 2, method 200 also includes an act of receiving test results from a software testing program, the test results including a test results status (act 240). For example, feedback module 145 may be configured to receive test results 140 from software testing module 135 where the testing results include a test results status. In some embodiments, the test results status may indicate that software code unit 105 passed or failed the unit test which was created to test that software code unit. In other cases, test results 140 may include indications of which portions of software code unit 105 passes, which failed, the length of processing time, number of software modules or libraries used, or any other information helpful to the software developer to determine why a test passed or failed. Feedback may also be generated to help the developer fix any problems in the tested software code unit.

Method 200 also includes an act of providing feedback to a user, the feedback indicating at least the test results status (act 250). For example, feedback module 145 may provide feedback 150 to user 155 where the feedback includes test results 140. Feedback module 145 may be configured to provide feedback to the user including code coverage, unexpected program behaviors (e.g. assertion violations and other unexpected exceptional behaviors) and suggested fixes for some of the unexpected program behaviors. Code coverage feedback may include indications of which lines of code were used during the test. Code coverage may also include branch coverage indicating which code branches were used during the test. Unexpected program behaviors may include any type of unexpected action and its location that occurs as a result of processing the software code unit. Suggested code fixes may include everything from basic, overall design suggestions to specific suggestions regarding how to fix errors in a single line of code.

In some embodiments, these suggestions may be graphically presented in a developer's IDE as in-line hints, placed in the source code next to the pertinent lines of code. In some embodiments, the IDE may be configured to automatically apply the suggested fixes. In other cases, the IDE will prompt the user to specify whether to apply the suggested fixes, not to apply any of them, or to apply a selected portion of the suggested fixes. Some embodiments may include an automatic retesting of software code unit 105 with the automatically applied code fix suggestions. Still other embodiments include determining that the received test results 140 indicate that a desired level of test quality was reached, and based on that determination, generating a new unit test. For example, if user 155 specified a level of test quality of 100% passing and test results 140 indicated that software code unit 105 had passed unit test 130 with a quality level of 100% passing, a new unit test would automatically be generated. Then, the developer could begin drafting software code designed to pass the newly generated unit test.

Other embodiments may include comprising determining that the received test results indicate that a desired level of test quality was not reached, and based on that determination, revising the software code unit such that a subsequent test of the software code unit yields the desired level of test quality. Similar to the example above, if user 155 specifies a level of test quality of 95% passing and test results 140 indicate that the software code unit 105 did not have a test quality of 95% passing, software code unit 105 would be revised to resolve errors such that the next test would result in a 95% passing test quality level. Typically, once software code unit 105 has been revised to the point of 100% passing, the unit test used to test software code unit 105 is no longer needed and may be discarded or stored in a database. The process of automatically maintaining unit tests will be explained in greater detail below with regard to FIGS. 3-5. While 95% was used in the above example, the level of test quality may be configured by the developer to be any percentage from 0-100% and may be different in each situation.

Figure 3:
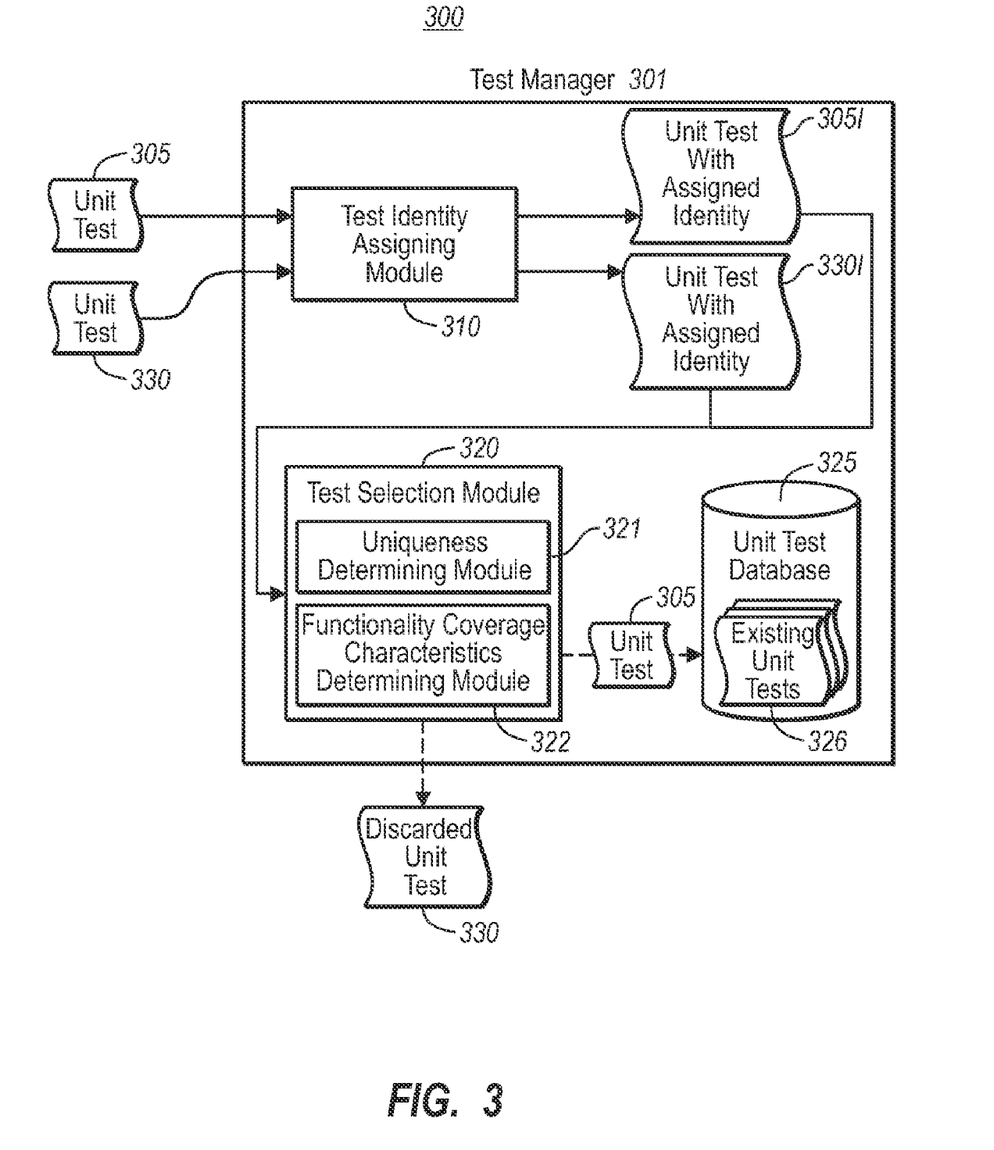
FIG. 3 illustrates an environment in which embodiments of the present invention may operate including automatically maintaining the unit test database.

FIG. 3 illustrates an environment 300 in which the principles of the present invention may be employed. Environment 300 includes test manager 301. In some embodiments, test manager 101 may be configured to automatically maintain unit test database 325. Test manager 301 and the components therein may be entirely or partially coupled to a computer system. Additionally or alternatively, each component of test manager 301 may be coupled to different computer systems and may communicate with each other using some type of wired or wireless communications link.

In some embodiments, test identity assigning module 310 may be configured receive unit tests 305 and 330 and assign an identity to each test. The identity may be any type of numerical, alphabetical or symbolic identity. The identity may be unique for each unit test, or alternatively, one or more unit tests may share a portion of identifier such that similar unit tests may be more easily grouped together. Test identity assigning module 310 may send unit tests with assigned identity 3051 and 3301 to test selection module 320. Test selection module 320 includes uniqueness determining module 321 and functionality coverage characteristics determining module 322 and may be configured to determine what is to be done with unit tests 3051 and/or 3301. The operation of such determinations will be explained below with reference to FIGS. 4 and 5. As shown in FIG. 3, unit tests may be discarded (e.g., discarded unit test 330) or may be stored in unit test database 325, which includes existing unit tests 326 (e.g., unit test 305).

Figure 4:
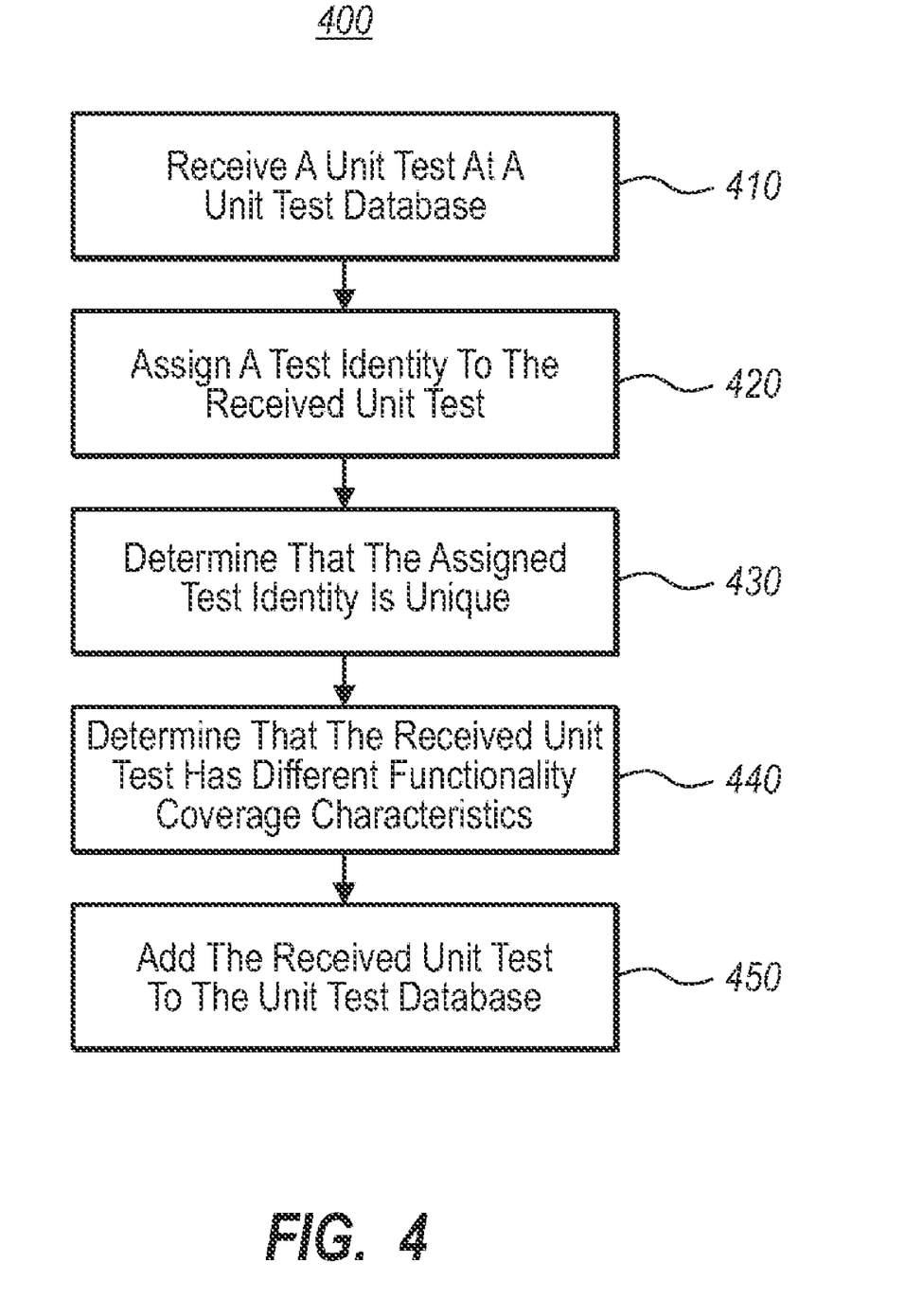
FIG. 4 illustrates a flowchart of an example method for automatically maintaining the unit test database.

FIG. 4 illustrates a flowchart of a method 400 for automatically maintaining a unit test database. The method 400 will now be described with frequent reference to the components and data of environment 300.

Method 400 includes an act of receiving a unit test at a unit test database (act 410). For example, test identity assigning module 310 may be configured to receive unit test 305 and/or unit test 330. In some embodiments, unit tests 305 and 330 may be assigned a test identity. After determining that the unit test should be kept send unit test 305 to unit test database 325 for storage. If, however, it is determined that unit test 330 does not need to be kept, unit test 330 can be discarded. In other embodiments, unit test 305 may be received directly by unit test database 325.

Method 400 includes an act of assigning a test identity to the received unit test, the test identity based on at least one of the unit test software code, unit test covered functionality and the identity of the parameterized unit test from which the received unit test was derived (act 420). For example, test identity assigning module 310 may assign a test identity to received unit test 305 (resulting in unit test with assigned identity 3051). The test identity may be based on the unit test software code, unit test covered functionality or the identity of the PUT from which unit test 305 was derived. For example, the test identity may be assigned based on certain words, lines of code, functions, methods, classes, functionality covered by the code, or based on an identifier associated with PUT 110. As explained above, covered functionality may include indications of which lines of code were used during the test. Furthermore, functionality coverage may also include branch coverage indicating which code branches were used during the test Functionality coverage may also include any exception type that was thrown during the test execution.

Method 400 includes an act of determining that the test identity assigned to the received unit test is unique when compared to other unit tests in the unit test database (act 430). For example, uniqueness determining module 321 may be configured to determine that unit test with assigned identity 3051 is unique when compared to other unit tests in unit test database 325. In some embodiments, uniqueness determining module 321 determines whether the test identifier is unique by comparing the identifier to other identifiers in database 325 associated with existing unit tests 326. In some cases, uniqueness determining module 321 may determine that the test identity assigned to received unit test 330 is not unique. Because the identifier indicates that the unit test is not unique, unit test 330 may be deleted (e.g., discarded unit test 330).

Method 400 includes, upon determining that the received unit test is unique in the unit test database, an act of determining that the received unit test has different functionality coverage characteristics than other unit tests in the unit test database (act 440). For example, if uniqueness determining module 321 determines that unit test 305 is unique in unit test database 325, functionality coverage characteristics determining module 322 may determine that unit test 305 has different functionality coverage characteristics than other existing unit tests 326. As mentioned above, functionality coverage characteristics include the portions of functionality covered by software code tested by unit test 305. For example, if a unit test covered the functionality of displaying a dialogue box, functionality coverage characteristics determining module 322 would determine that the functionality of displaying a dialogue box is covered. Thus, in this example, if a new unit test is received that has been identified as unique, but also covers the functionality of displaying a dialogue box, the test may either be discarded, or the portions thereof that are new may be added to an existing test that already included that functionality coverage.

Determining that the received unit test has different functionality coverage characteristics than other unit tests in unit test database 325 may also include determining that the unit test provides functionally different results. For example, if uniqueness determining module 321 is configured to determine that a unit test is unique based on whether the first three lines of code are unique, regardless of the rest of the lines, then one or more unit tests with the same first three lines of code may be declared as not unique. Such unit tests containing some unique code and some non-unique code may be useful where the non-unique code covers different code functionality. Thus, in cases where received unit test is determined not to be unique, the test may still be useful because it provides functionally different results. Thus, the non-unique portion of the unit test may be added to one or more existing unit tests in unit test database 325. Note that in the above example, uniqueness determining module 321 may determine uniqueness based on one or more of a variety of factors and a varying percentage of code that is actually the same. In some cases, unit tests can be assigned unique identifiers even though the source code is word-for-word identical. As explained above, uniqueness may be determined by covered functionality and not just similarities in the source code.

Method 400 includes, upon the determining that the received unit test has different functionality coverage characteristics, an act of adding the received unit test to the unit test database (act 450). For example, functionality coverage characteristics determining module 322 may determine that unit test 305 has different functionality coverage characteristics than that covered by existing unit tests 326 and may be added to the unit test database 326. In some embodiments, only that portion that is unique or contains non-overlapping functionality coverage will be added to the unit test database 325 and may be appended to one or more existing unit tests 326. Thus, unit test database 325 may be continually updated with unit tests that cover different functionality and may purge outdated unit tests or received unit tests that do not add any new functionality.

Figure 5:
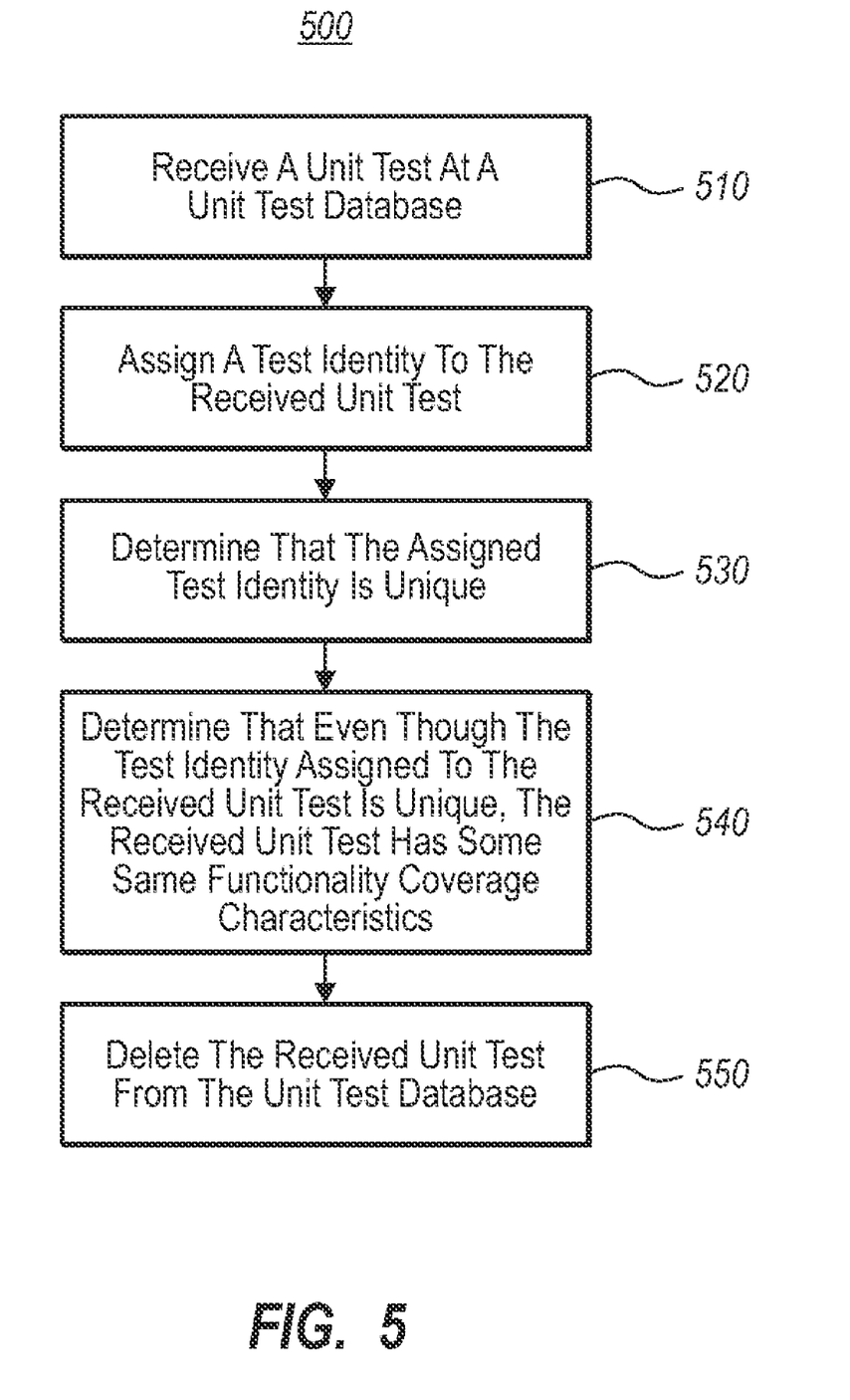
FIG. 5 illustrates a flowchart of an alternate example method for automatically maintaining the unit test database.

FIG. 5 illustrates a flowchart of an alternative method 500 for automatically maintaining a unit test database. The method 500 will now be described with frequent reference to the components and data of environment 300.

Method 500 includes an act of receiving a unit test at a unit test database (act 510). For example, test identity assigning module 310 may receive unit test 305. In some embodiments, unit test 305 may be directly stored in unit test database 325. Unit test database 325 may be divided into one or more portions for categorizing unit tests based on the time of creation. For example, all tests created before a designated time may be stored in an "Old" unit test database, while all tests created before the designated time may be stored in a "New" unit test database. The distinctions may be purely semantic (e.g. all tests are stored in the same database under different headings) or the tests may be stored in physically separate electronic data storage items.

Method 500 includes an act of assigning a test identity to the received unit test, the test identity based on at least one of the unit test software code, unit test covered functionality and the identity of the parameterized unit test from which the received unit test was derived (act 520). For example, test identity assigning module 310 may be configured to assign a test identity to unit test 330 (resulting in unit test with assigned identity 3301). The test identity may be based on the unit test software code, unit test covered functionality or the identity of the PUT from which the received unit test was derived.

Method 500 includes an act of determining that the test identity assigned to the received unit test is unique when compared to other unit tests in the unit test database (act 530). For example, uniqueness determining module 321 may be configured to determine that the identity assigned to unit test 3301 is unique when compared to the identities of existing unit tests 326. As explained above, uniqueness may be determined in a variety of manners and to a variety of degrees. In some as embodiments, uniqueness determining module 321 may determine that the test identity assigned to received unit test 3301 is not unique. Based on that determination, unit test 330 may be deleted.

Method 500 includes, upon determining that the received unit test is unique in the unit test database, an act of determining that even though the test identity assigned to the received unit test is unique, the received unit test has fully overlapping functionality coverage characteristics when compared to other unit tests in the unit test database (act 540). For example, uniqueness determining module 321 may determine that received unit test 305 is unique in unit test database 325. Despite the uniqueness determination, functionality coverage characteristics determining module 322 may determine that unit test 305 has fully overlapping functionality coverage characteristics when compared to other tests in unit test database 325. Thus, although a unit test is identified as unique, in some cases, the unique unit test is not automatically kept. In some embodiments, any portion of functionality overlap is cause for discarding the unit test. In other embodiments, existing unit tests 326 may be updated with the non-overlapping portions of functionality coverage provided in the received unit test. In other cases, the unit test may be stored in unit test database 325 despite having some overlapping functionality. Furthermore, where received unit test 330 is neither unique nor has different functionality coverage, the unit test may be deleted.

Method 500 includes an act of upon the determining that the received unit test has fully overlapping functionality coverage characteristics, an act of deleting the received unit test from the unit test database (act 550). For example, functionality coverage characteristics determining module 322 may determine that received unit test 305 has fully overlapping functionality coverage characteristics as those of existing unit tests 326. In some cases, this determination is made because the received unit test provides functionally similar test results. Test selection module 320 may determine whether or not to discard the received unit test. In some cases, if a certain percentage of the functionality coverage is overlapping, the test will be kept, and if the overlapping functionality coverage is below the specified percentage, the unit test will be deleted.

Thus, unit tests may be automatically generated from parameterized unit tests by instantiating input parameter values, and a database of unit tests may be automatically maintained.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system, a method for automatically generating unit tests by instantiating one or more generated input parameter values, the unit tests being derived from a corresponding parameterized unit test, the method comprising:
   an act of accessing a parameterized unit test, the parameterized unit test configured to test any of a plurality of behaviors of the unit of software code by providing a base outline from which any of a plurality of corresponding other unit tests can be formed to test individual behaviors from among the plurality of behaviors;
   an act of generating input parameter values for testing an individual behavior of the unit of software code;
   an act of automatically generating a unit test from the parameterized unit test by applying the one or more generated input parameter values to the parameterized unit test so as to modify the base outline into a unit test specifically configured for testing the individual behavior of the unit of software code, the unit test configured to assess the functionality of the individual behavior of the unit of software code, the generated input parameter values corresponding to parameters in the unit of software code that are to be tested;
   an act of submitting the unit of software code and the automatically generated unit test to a software testing program to test execution of the unit of software code based on the automatically generated unit test;
   an act of receiving test results from the software testing program, the test results including a test results status generated from executing the unit of software code based on the automatically generated unit test; and
   an act of providing feedback to a user, the feedback indicating at least the test results status.

2. The method of claim 1, further comprising generating the generated input parameter values for the parameterized unit test using symbolic execution.

3. The method of claim 1, further comprising generating the generated input parameter values for the parameterized unit test using pairwise combinatorial techniques.

4. The method of claim 1, wherein the feedback comprises code suggestions that indicate how to fix a detected error.

5. The method of claim 4, wherein the feedback is presented as an in-line hint in the software code.

6. The method of claim 4, further comprising:
   an act of automatically applying the code suggestions to the software code unit; and
   an act of automatically re-submitting the unit of software code and the automatically generated unit test to the software testing program subsequent to automatically applying the code suggestions so as to re-test execution of the unit of software code with the automatically applied code suggestions.

7. The method of claim 1, further comprising an act of searching for new input values for new tests subsequent to submitting the unit of software code and the automatically generated unit test and prior to receiving test results such that new input values are searched for while the software testing program tests execution of the unit of software code.

8. The method of claim 1, further comprising:
   an act of determining that the received test results indicate that a desired level of test quality was reached; and
   based on the determination, an act of generating a new unit test.

9. The method of claim 1, further comprising:
   an act of determining that the received test results indicate that a desired level of test quality was not reached; and
   based on the determination, an act of revising the software code unit such that a subsequent test of the software code unit yields the desired level of test quality.

10. The method of claim 1, wherein the base outline comprises one or more software functions that are to be tested.

11. A computer program product for use at a computer system, the computer program product for implementing a method for automatically generating unit tests by instantiating one or more generated input parameter values, the unit tests being derived from a corresponding parameterized unit test, the computer program product comprising one or more computer storage media having stored thereon computer-executable instructions that, when executed at a processor, cause the computer system to perform the method, including the following:
   access a parameterized unit test, the parameterized unit test configured to test any of a plurality of behaviors of the unit of software code by providing a base outline from which any of a plurality of corresponding other unit tests can be formed to test individual behaviors from among the plurality of behaviors;
   generate input parameter values for testing an individual behavior of the unit of software code;
   generate a unit test from the parameterized unit test by applying the one or more generated input parameter values to the parameterized unit test so as to modify the base outline into a unit test specifically configured for testing the individual behavior of the unit of software code, the unit test configured to assess the functionality of the individual behavior of the unit of software code, the generated input parameter values corresponding to parameters in the unit of software code that are to be tested;
   submit the unit of software code and the automatically generated unit test to a software testing program to test execution of the unit of software code based on the automatically generated unit test;
   receive test results from the software testing program, the test results including a test results status generated from executing the unit of software code based on the automatically generated unit test; and
   provide feedback to a user, the feedback indicating at least the test results status.

12. The computer program product of claim 11, further comprising computer-executable instructions that, when executed, cause the computer system to generate the generated input parameter values for the parameterized unit test using symbolic execution.

13. The computer program product of claim 11, further comprising computer-executable instructions that, when executed, cause the computer system to generate the generated input parameter values for the parameterized unit test using pairwise combinatorial techniques.

14. The computer program product of claim 11, wherein the feedback comprises code suggestions that indicate how to fix a detected error.

15. The computer program product of claim 14, wherein the feedback is presented as an in-line hint in the software code.

16. The computer program product of claim 14, further comprising computer-executable instructions that, when executed, cause the computer system to:
   apply the code suggestions to the software code unit; and
   re-submit the unit of software code and the automatically generated unit test to the software testing program subsequent to automatically applying the code suggestions so as to re-test execution of the unit of software code with the automatically applied code suggestions.

17. The computer program product of claim 11, further comprising computer-executable instructions that, when executed, cause the computer system to search for new input values for new tests subsequent to submitting the unit of software code and the automatically generated unit test and prior to receiving test results such that new input values are searched for while the software testing program tests execution of the unit of software code.

18. The computer program product of claim 11, further comprising computer-executable instructions that, when executed, cause the computer system to:
    determine that the received test results indicate that a desired level of test quality was reached; and
    based on the determination, generate a new unit test.

19. The computer program product of claim 11, further comprising computer-executable instructions that, when executed, cause the computer system to:
    determine that the received test results indicate that a desired level of test quality was not reached; and
    based on the determination, revise the software code unit such that a subsequent test of the software code unit yields the desired level of test quality.

20. The computer program product of claim 11, wherein the base outline comprises one or more software functions that are to be tested.

* * * * *